Figure 30:
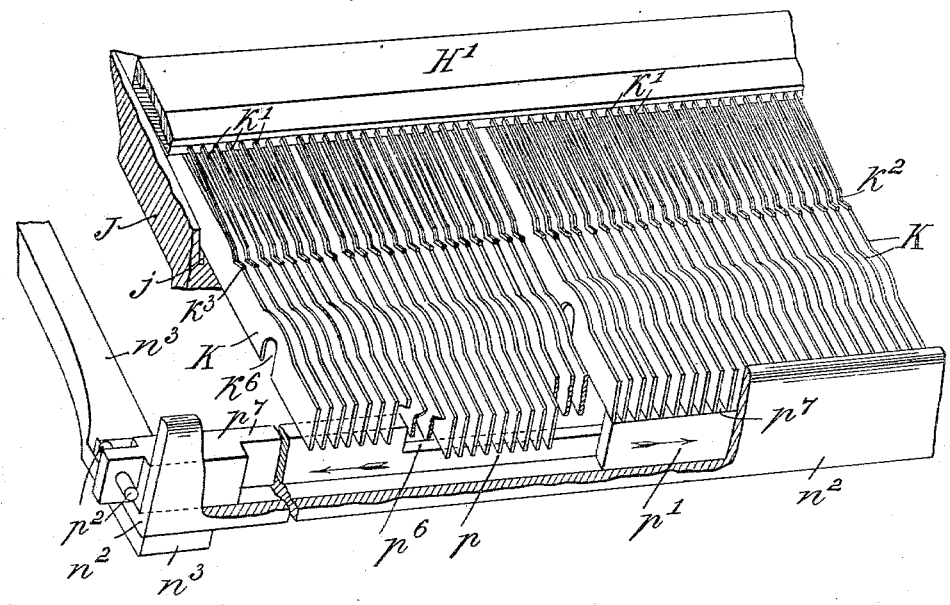
Figure 32:
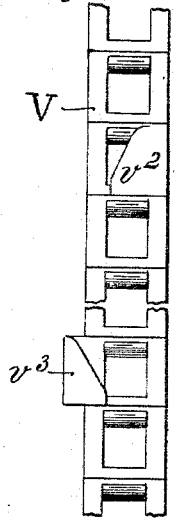
Figure 33:
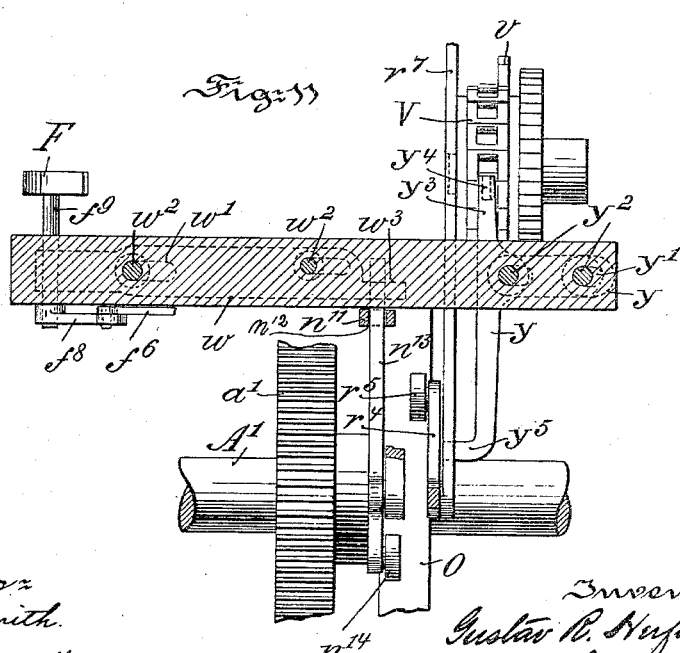

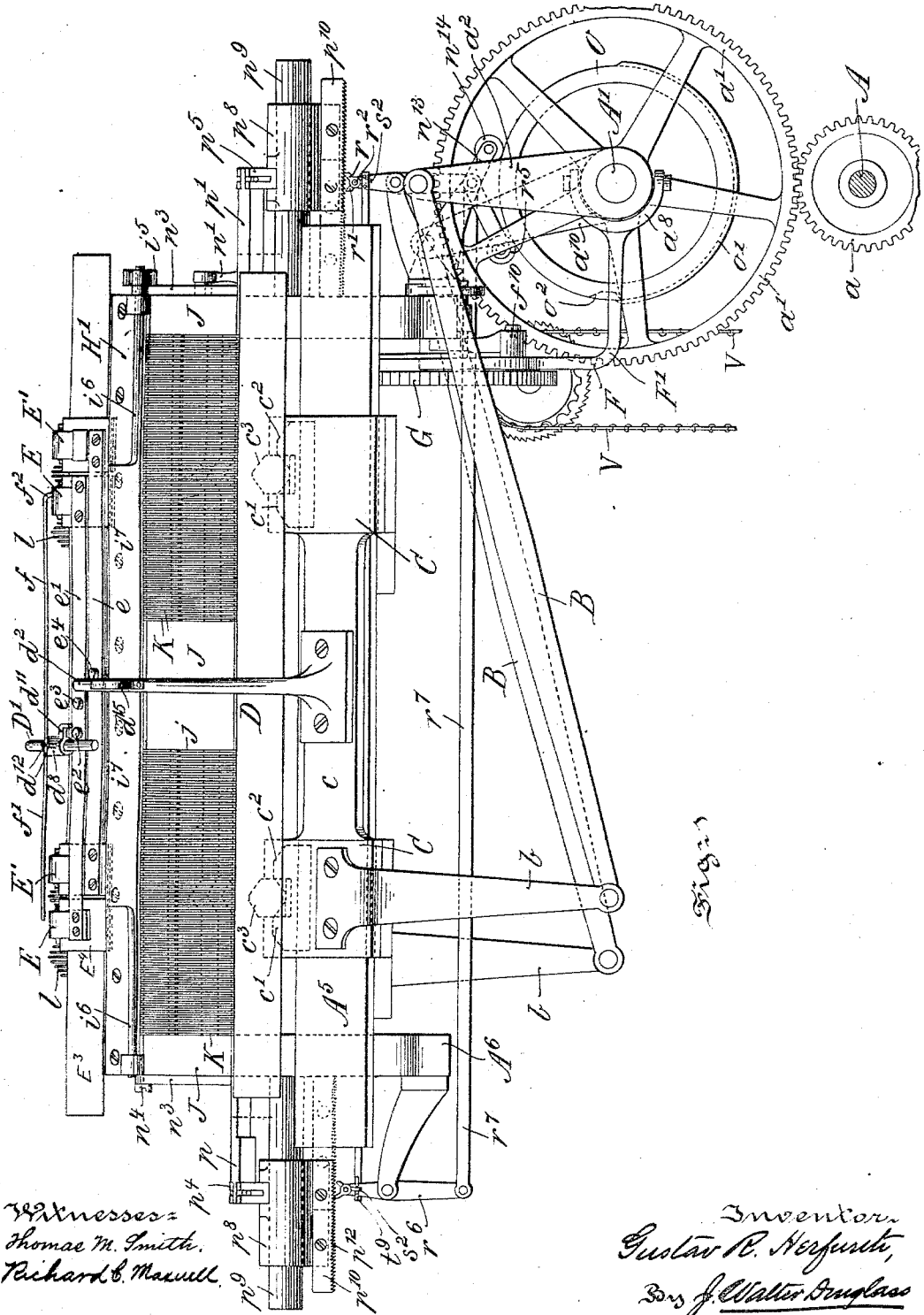

(No Model.)
G. R. HERFURTH.
STRAIGHT KNITTING MACHINE.
No. 556,749. Patented Mar. 24, 1896.
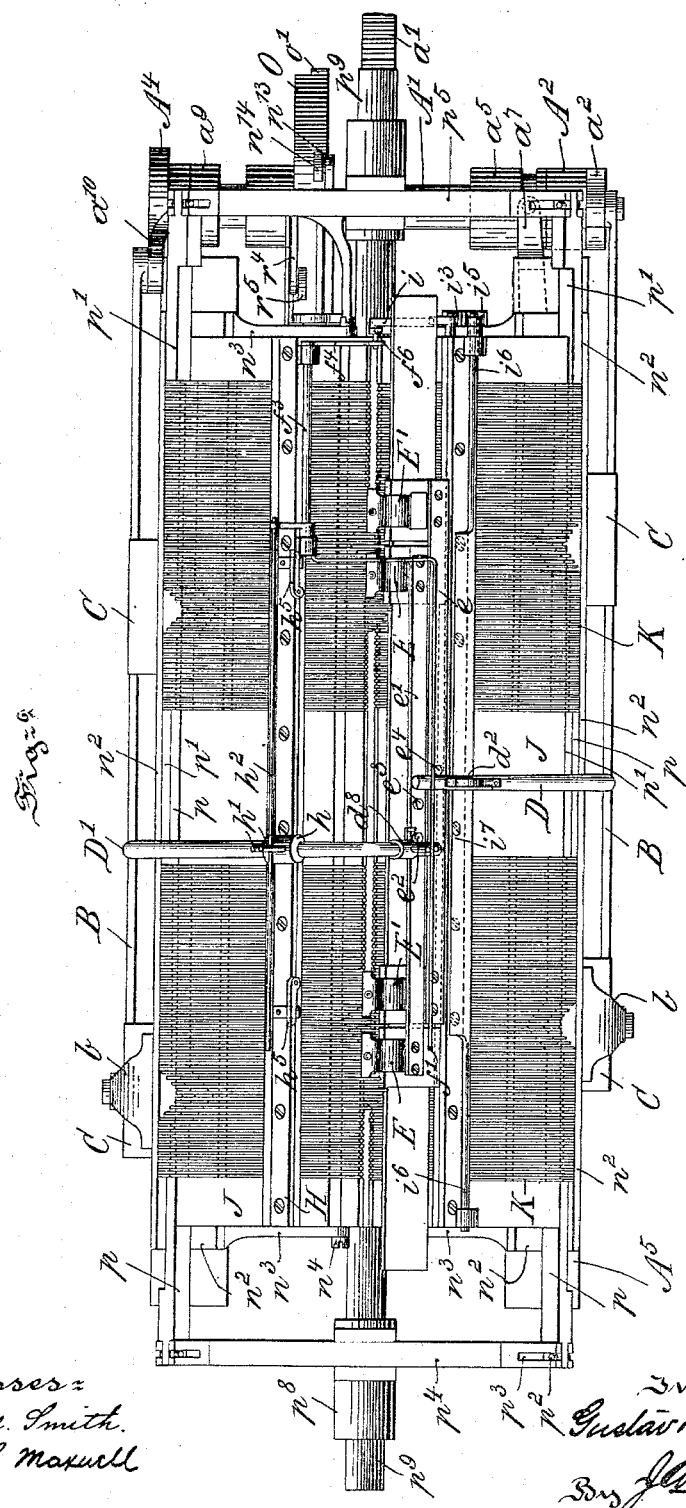
Witnesses:
Thomas M. Smith.
Richard C. Maxwell
Inventor.
Gustav R. Herfurth,
By J. Walter Douglas.
Attorney.

(No Model.) 14 Sheets—Sheet 3.
G. R. HERFURTH.
STRAIGHT KNITTING MACHINE.
No. 556,749. Patented Mar. 24, 1896.
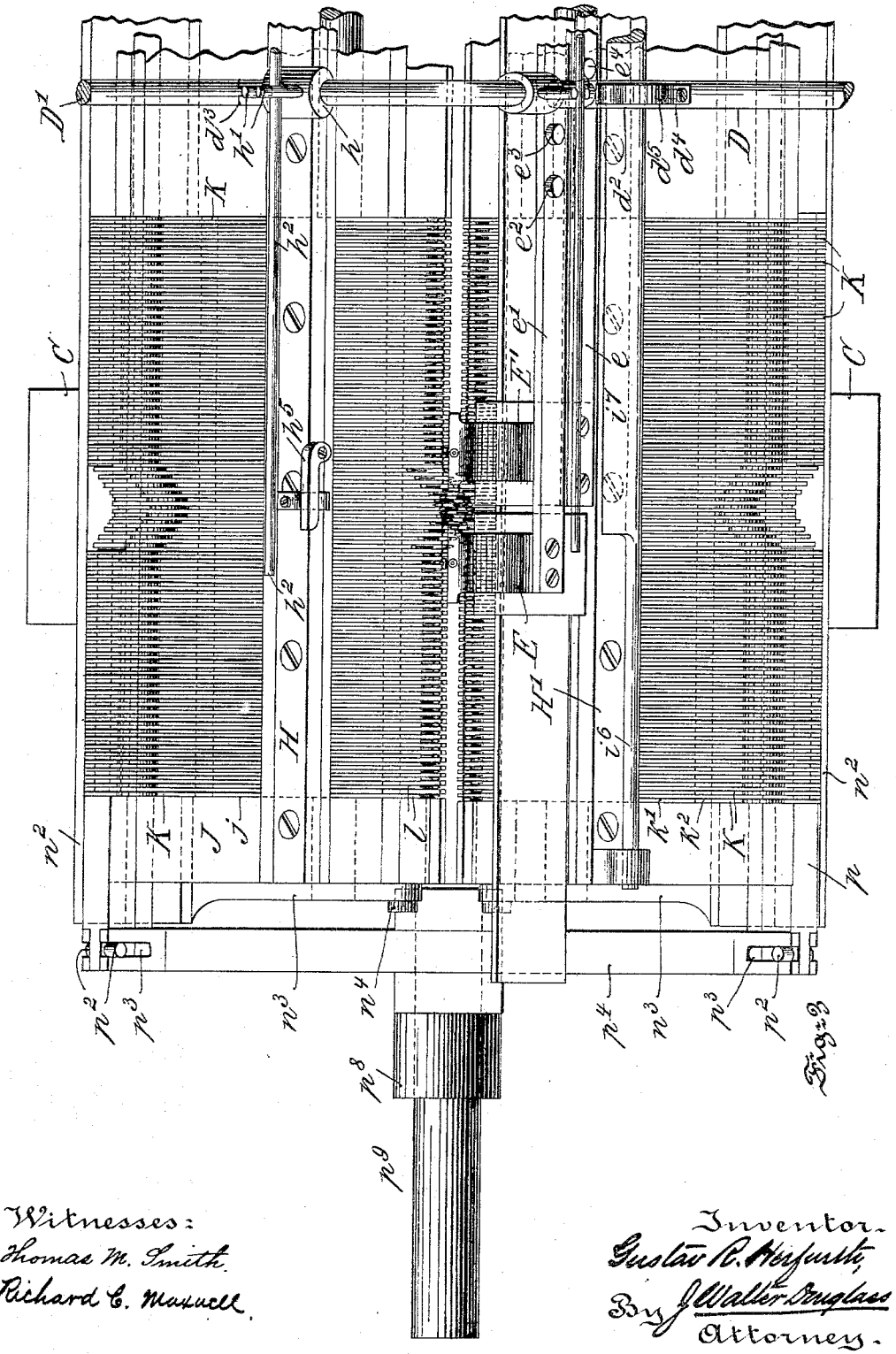
Witnesses:
Thomas M. Smith
Richard C. Maxwell
Inventor
Gustav R. Herfurth,
By J. Walter Douglass
Attorney.

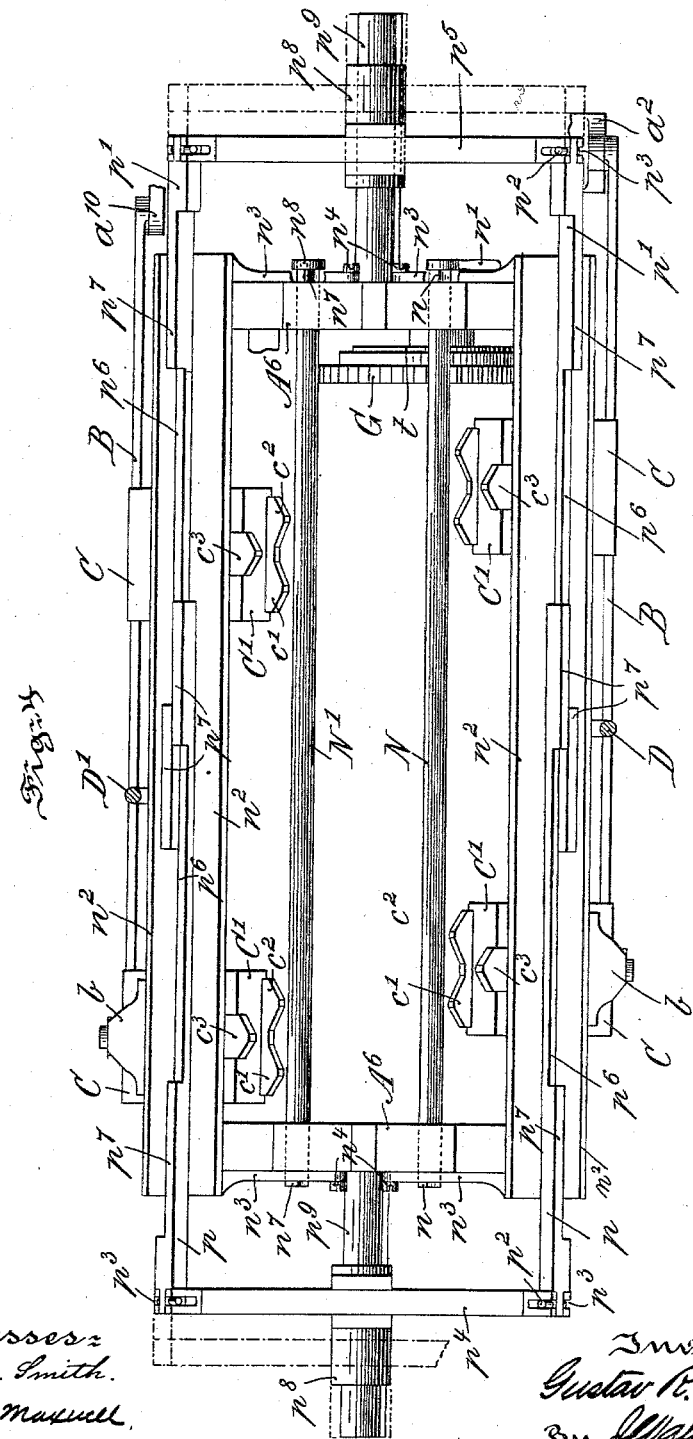

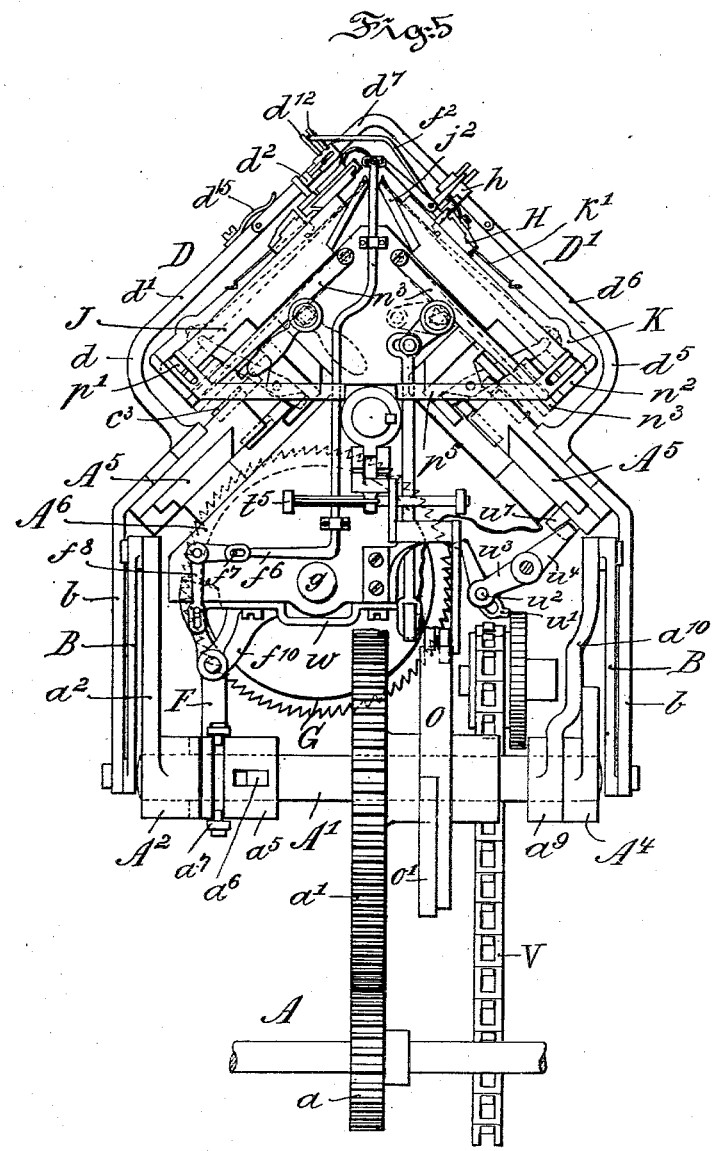

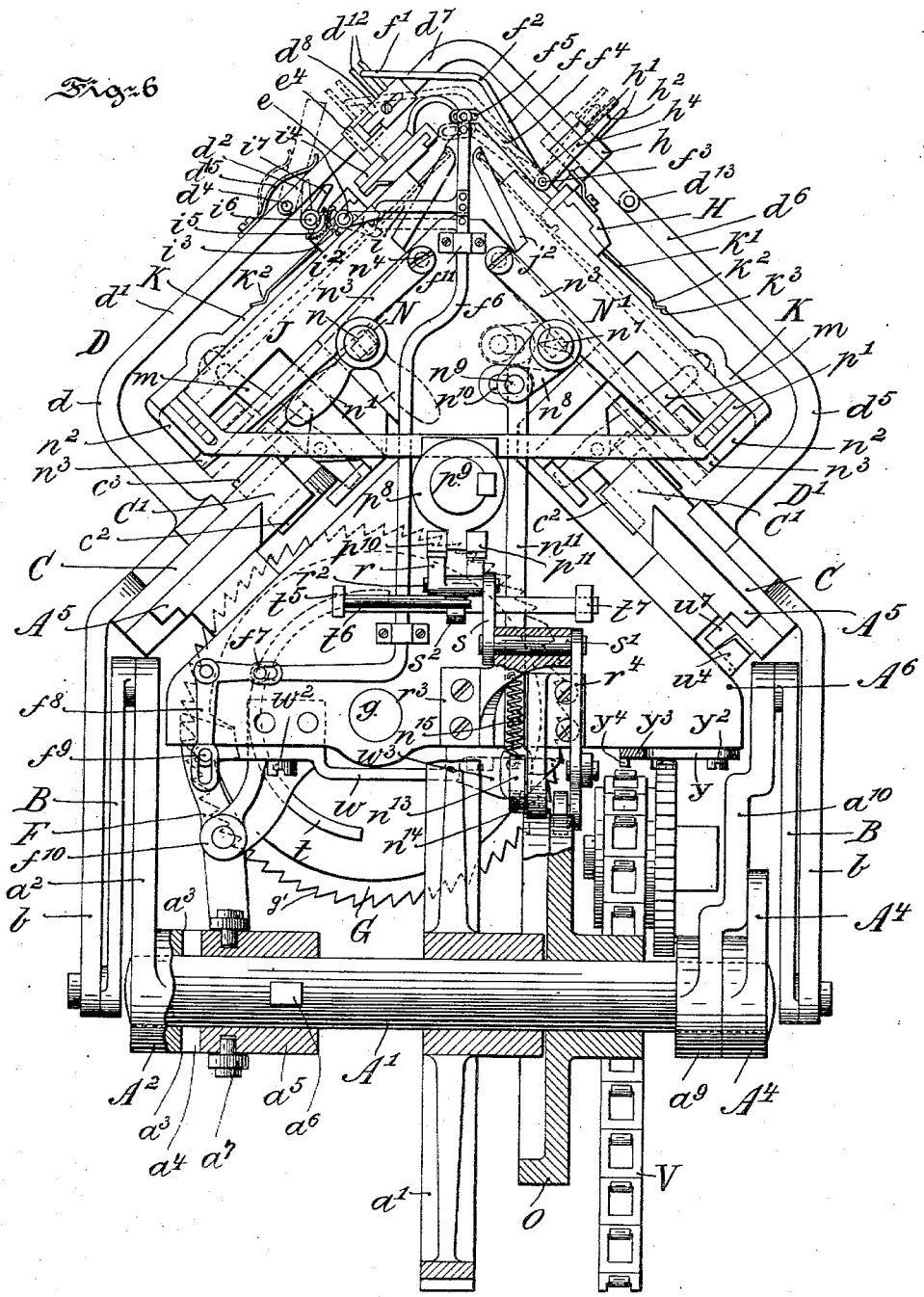

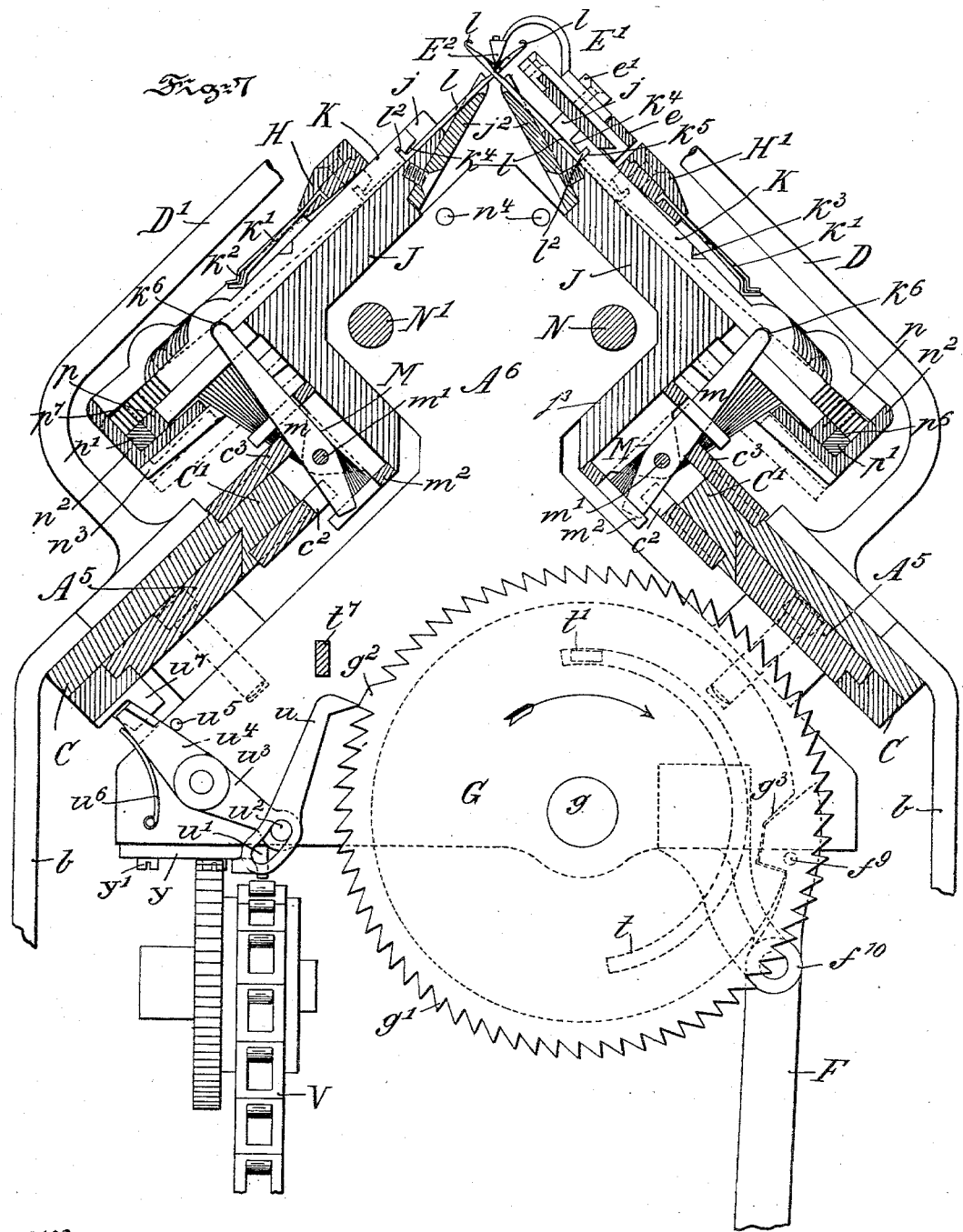

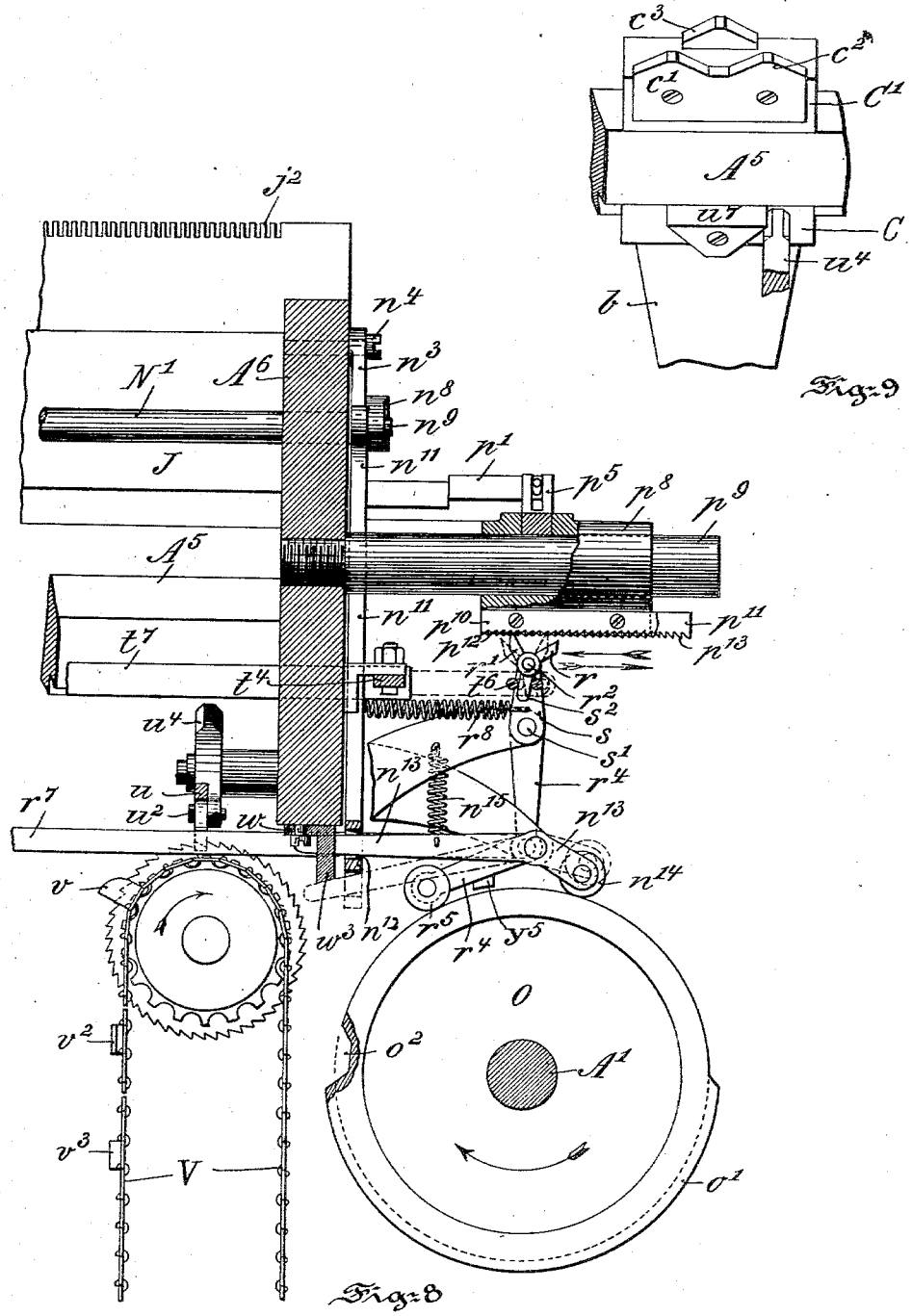

(No Model.) 14 Sheets—Sheet 9.

G. R. HERFURTH.
STRAIGHT KNITTING MACHINE.

No. 556,749. Patented Mar. 24, 1896.

Witnesses:
Thomas M. Smith.
Richard C. Maxwell.

Inventor:
Gustav R. Herfurth,
By J. Walter Douglass
Attorney.

(No Model.)
G. R. HERFURTH.
STRAIGHT KNITTING MACHINE.
No. 556,749. Patented Mar. 24, 1896.
14 Sheets—Sheet 10.
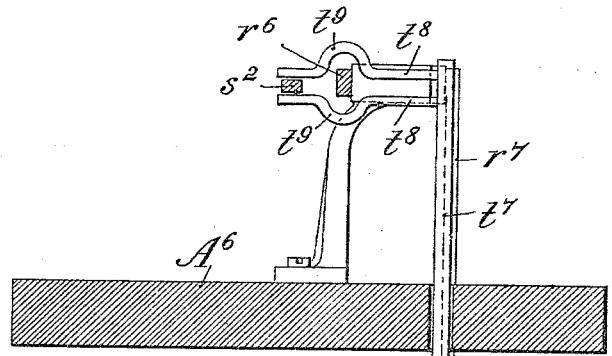
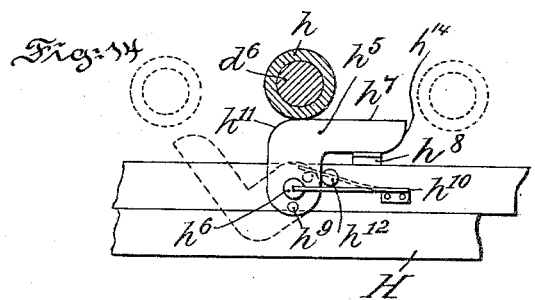
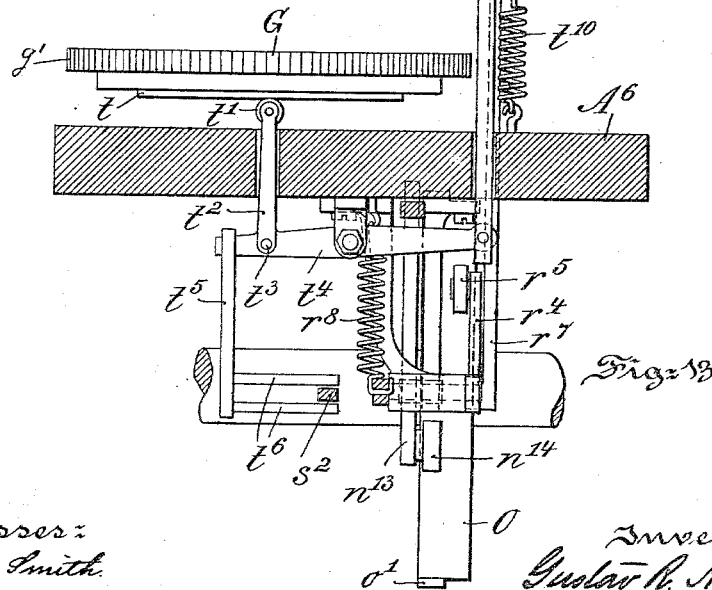
Witnesses:
Thomas M. Smith.
Richard C. Maxwell.
Inventor:
Gustav R. Herfurth
By J. Walter Douglass
Attorney.

(No Model.)

G. R. HERFURTH.
STRAIGHT KNITTING MACHINE.

No. 556,749. Patented Mar. 24, 1896.

Witnesses:
Thomas M. Smith
Richard C. Maxwell

Inventor
Gustav R. Herfurth
By J. Walter Douglass
Attorney

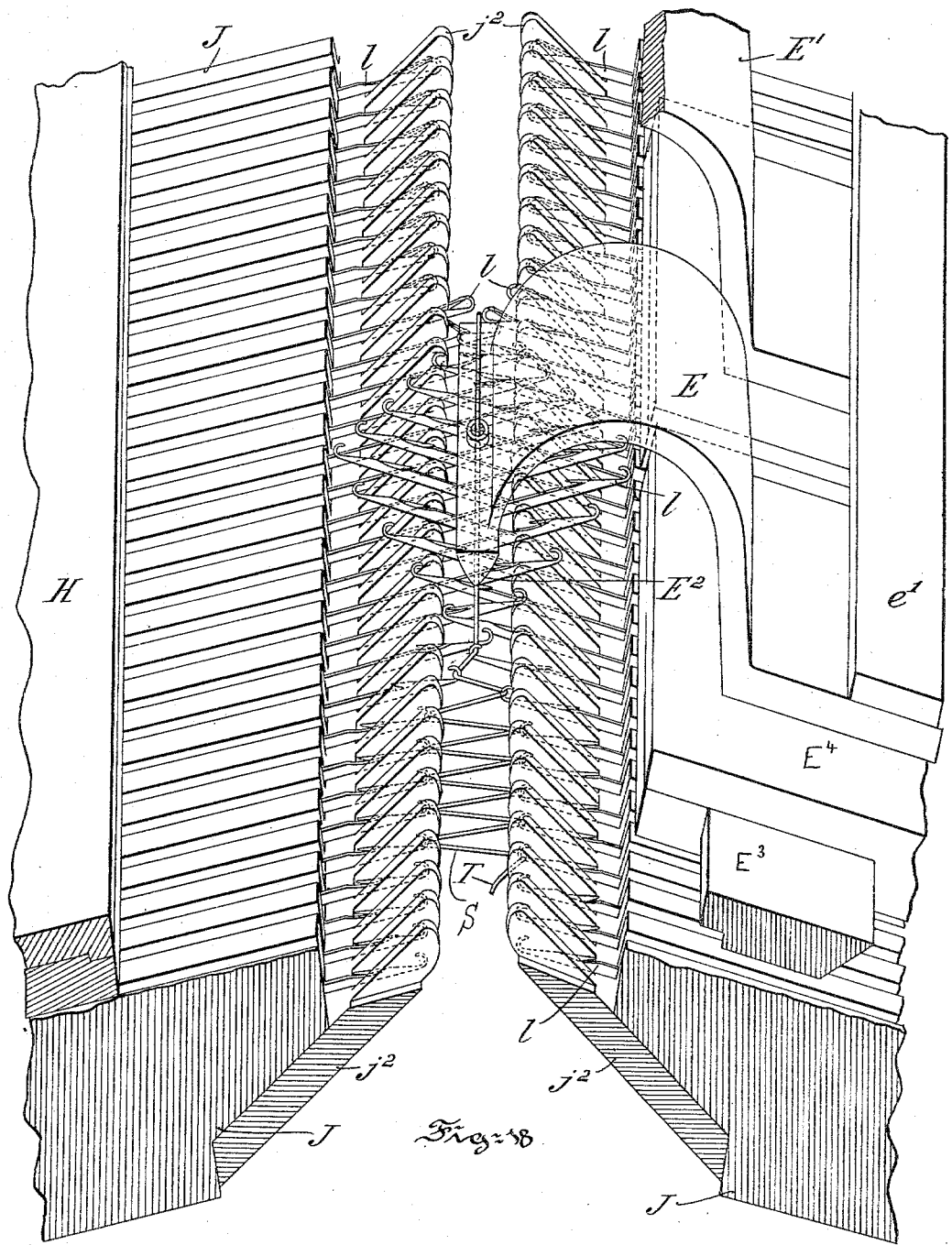

(No Model.)  
14 Sheets—Sheet 13.

G. R. HERFURTH.
STRAIGHT KNITTING MACHINE.

No. 556,749. Patented Mar. 24, 1896.

Witnesses:
Thomas M. Smith.
Richard C. Maxwell.

Inventor:
Gustav R. Herfurth,
By J. Walter Douglass.
Attorney.

(No Model.)

G. R. HERFURTH.
STRAIGHT KNITTING MACHINE.

No. 556,749. Patented Mar. 24, 1896.

Witnesses:
Thomas M. Smith.
Richard E. Maxwell.

Inventor.
Gustav R. Herfurth,
By J. Walter Douglas
Attorney.

UNITED STATES PATENT OFFICE.

GUSTAV R. HERFURTH, OF PHILADELPHIA, PENNSYLVANIA, ASSIGNOR TO PAUL SCHLOSSMANN, OF SAME PLACE.

STRAIGHT-KNITTING MACHINE.

SPECIFICATION forming part of Letters Patent No. 556,749, dated March 24, 1896.

Application filed April 22, 1895. Serial No. 546,670. (No model.)

*To all whom it may concern:*

Be it known that I, GUSTAV R. HERFURTH, a subject of the Emperor of Germany, but having declared my intention of becoming a citizen of the United States, residing at the city of Philadelphia, in the county of Philadelphia and State of Pennsylvania, have invented certain new and useful Improvements in Straight-Knitting Machines, of which the following is a specification.

My invention has relation to a machine of the class known as "straight-knitting machines" for fabricating full-fashioned hosiery, underwear or other tubular fabrics; and it relates particularly to the general construction and arrangement of such a machine for the production of such fabrics.

The principal objects of my invention are, first, to provide a straight-knitting machine wherein hosiery, underwear or other full-fashioned tubular fabrics may be knit, which machine is simple and durable in construction and efficient in operation; second, to provide a straight-knitting machine in which the cam-slides may be adjusted with relation to each other in respect to the movement thereof to operate the needles successively or simultaneously; third, to provide a straight-knitting machine in which the thread-guides are in line with each other over the middle of the machine and move back and forth together; fourth, to provide a straight-knitting machine wherein on one side of the machine the mechanism for operating the thread-guides may be locked to one of the thread-guide plates or carriers; fifth, to provide a straight-knitting machine in which the cam-slides on one side of the machine may be stopped and the needles on that side of the machine rendered inoperative; sixth, to provide in a straight-knitting machine a mechanism for lifting one of the thread-guide bars out of engagement with one of the thread-guide plates or carriers and throwing the same into engagement with the other thread-guide plate or carrier; seventh, to provide in a straight-knitting machine mechanism whereby certain needles of the machine may be thrown into or out of action to widen or narrow the fabric knit on the machine; eighth, to provide a straight-knitting machine wherein the needle slides or bars are supported at one end by longitudinally-movable and recessed fashioning-slides and adapted to rest in the recesses of said fashioning-slides when the needles are thrown into action, and, ninth, to provide in a straight-knitting machine mechanism for shifting these fashioning-slides in opposite directions, so as to increase or decrease the width of the effective portion of the recesses therein and thereby to increase or decrease the number of needles thrown into action.

My invention consists of a knitting-machine constructed, arranged and adapted for operation in substantially the manner as hereinafter described and claimed.

The nature and general features of my invention will be more fully understood from the following description, taken in connection with the accompanying drawings, forming part hereof, in which—

Figure 16:
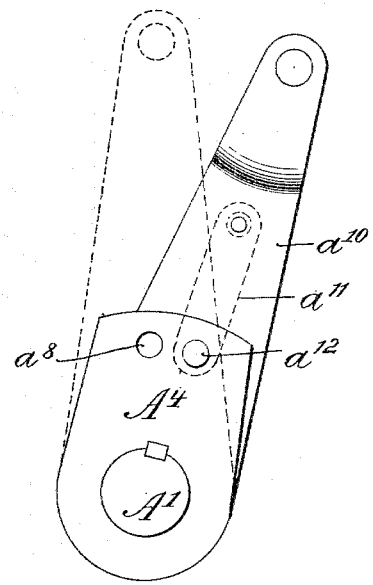
Figure 17:
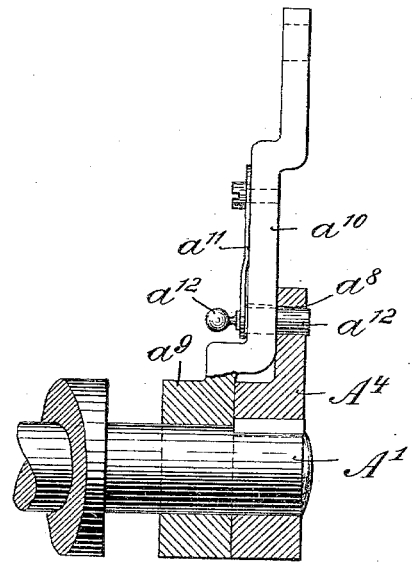
Figure 15:
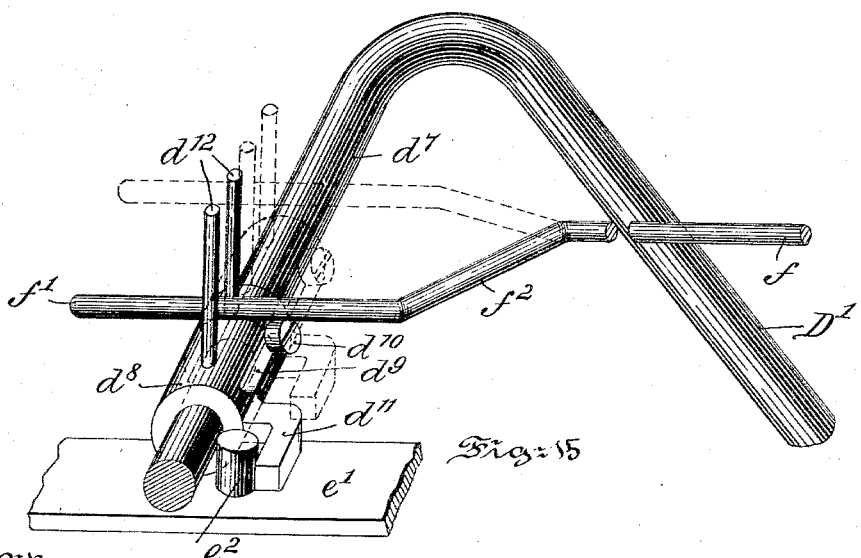
Figure 19:
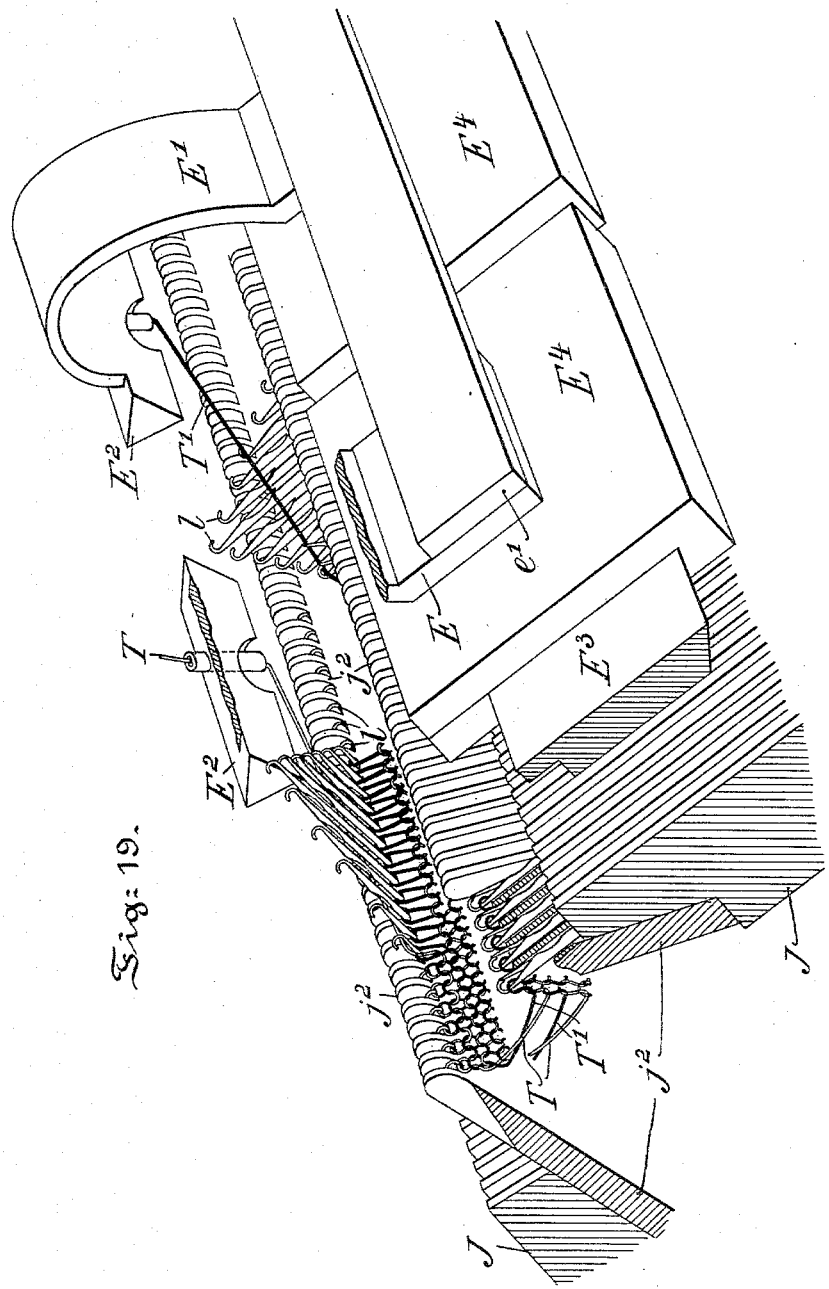
Figure 20:
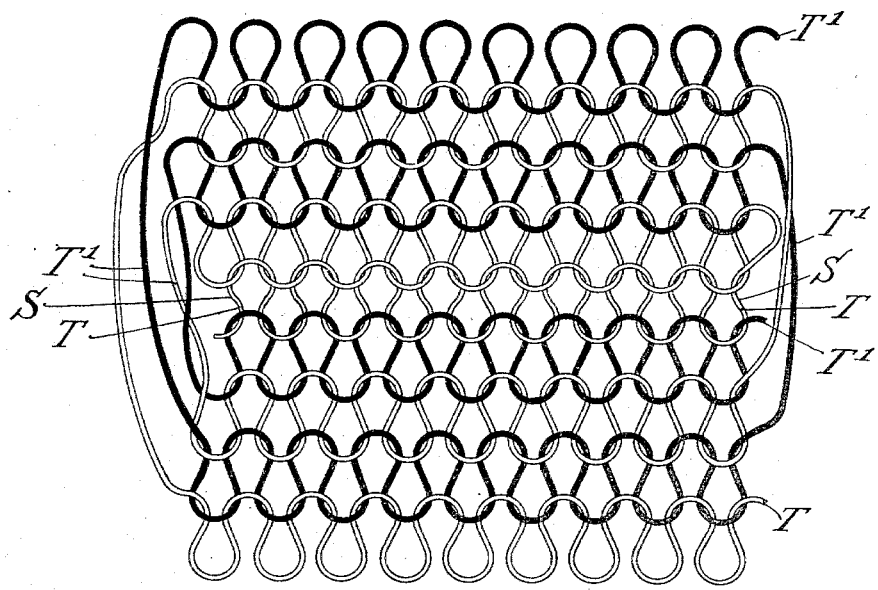
Figure 21:
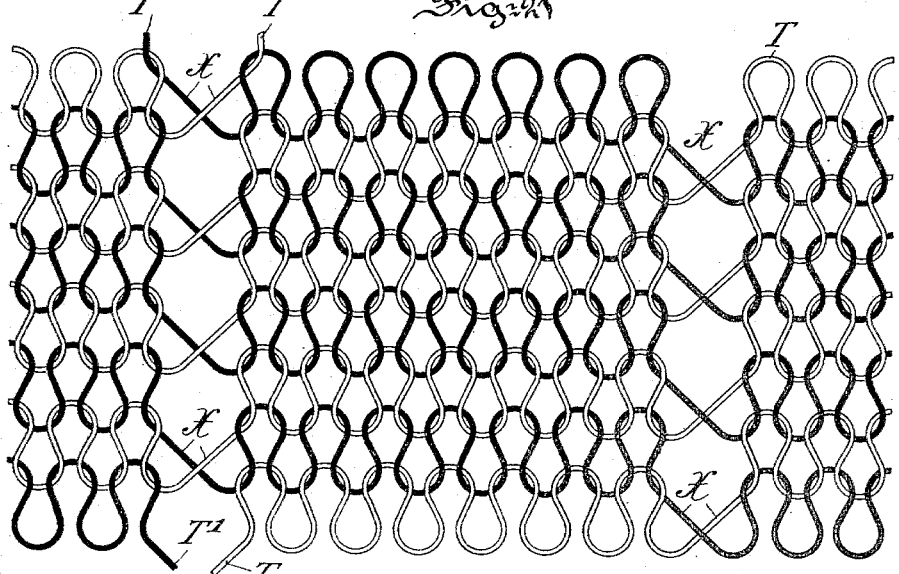

Figure 1 is a side elevational view of a straight-knitting machine embodying the main features of my invention, illustrating the driving mechanism for the cam-slides and thread-guides and the mechanism for shifting the fashioning-slides. Fig. 2 is a top or plan view of a straight-knitting machine, illustrating the needle-slides, needles carried thereby, the thread-guides, bars for shifting the same, and the cam-latches for throwing one of the bars adapted to shift each set of guides alternately into and out of action. Fig. 3 is an enlarged top or plan view of one end of Fig. 2, illustrating the position of the needles and the slides carrying the same when beginning the knitting of an article. Fig. 4 is a top or plan view of a straight-knitting machine with the needles, needle-slides, needle-beds, and thread-guides removed, illustrating the fashioning-slides and the cams adapted to actuate, through suitable jacks, the needles and needle-slides. Fig. 5 is an end elevation, partly broken away, of the machine, looking from the power end, certain portions being removed for clearness, illustrating the general features of my invention. Fig. 6 is an enlarged end elevation, partly in section, of the machine, looking from the power end thereof. Fig. 7 is an enlarged cross-sectional view of the machine, illustrating the needle-slides, jacks for operating the same, the cams for operating the jacks, a pattern-chain and its accessories, a pawl operated by said pattern-chain to automatically operate mechanism for controlling the shifting of the fashioning-slides on one side of the machine and for throwing out of action the other side thereof. Fig. 8 is an enlarged detail side elevational view of a portion of the power end of the machine, partly sectioned and certain portions being removed to more clearly illustrate the mechanism for longitudinally shifting the fashioning-slides and for raising and lowering the same during the shifting in one direction, as in the operation of narrowing. Fig. 9 is a perspective view illustrating in detail one of the cams actuating the jacks and also actuating the mechanism controlling the operation of the fashioning-slides on that side of the machine and for throwing the other side of the machine out of action. Fig. 10 is a detached perspective view of a portion of the needle-slides, the needle-bed, the fashioning-slides, and an arm for raising and lowering said fashioning-slides. Fig. 11 is an enlarged plan view, partly sectioned, of the mechanism for locking out of action the devices for effecting the vertical and longitudinal movement of the fashioning-slides during certain intervals in the operation of knitting. Fig. 12 is a view illustrating in detail a portion of the pattern-chain illustrated in Fig. 11, said pattern-chain being spread out upon a flat surface. Fig. 13 is a top elevation or plan view of the mechanism for controlling the oppositely-arranged pawls on either end of the machine, adapted to shift the fashioning-slides longitudinally in opposite directions. Fig. 14 is a side elevation, enlarged, of one of the cam-latches for throwing one of the bars to shift each set of thread-guides alternately. Fig. 15 is a side elevation, enlarged, of one of the bars which shift each set of thread-guides alternately, illustrating the mechanism for locking said bar to one set of thread-guides during a certain interval of the knitting. Fig. 16 is a side elevation, enlarged, of an adjustable crank-arm adapted to operate the cam-slides and thread-guides on one side of the machine. Fig. 17 is a side view of Fig. 16, partly sectioned, illustrating the device for adjusting said crank-arm to a bracket carried by the driving-shaft. Fig. 18 is a perspective view of the top of the machine, illustrating the position assumed by the needles and thread during the beginning of knitting, one thread only being brought into use. Fig. 19 is an isometrical view of the top of the machine, showing the position assumed by the needles and threads during the operation of knitting and illustrating the use of two threads and the crossing thereof at the sides of the fabric after the article to be knit has been begun. Fig. 20 is a top plan or elevational view, greatly enlarged, of the exterior of a fabric adapted to be knitted upon the machine, showing the commencement of the knitting by the use of one thread and the continuation thereof by the use of two threads; and Fig. 21 is a view, enlarged, of the fabric cut lengthwise and laid flat, illustrating the exterior of the fabric and the crossing of the threads at certain portions thereof.

Referring to the drawings, A represents the power-shaft and $a$ the gear-wheel secured thereto.

$A'$ represents the driving-shaft of the machine and $a'$ the gear-wheel secured thereto and meshing with the gear-wheel $a$. At one end of the shaft $A'$ and loosely mounted thereon is a sleeve $A^2$, which carries a crank-arm $a^2$. This sleeve $A^2$ is notched, as at $x^3$, and adapted to receive corresponding prongs $a^4$ of a sleeve $a^5$, which rotates with the shaft $A'$, being slotted to keys $a^6$ thereof. This sleeve $a^5$ is adapted to be moved laterally on the shaft $A'$, through the slotted connection aforesaid, by means of a clutch-fork $a^7$, as illustrated in Figs. 5 and 6. This lateral movement of the sleeve $a^5$ serves to bring its prongs $a^4$ into and out of engagement with the notches $a^3$ of the sleeve $A^2$, and to thereby lock or unlock the sleeve $A^2$ to the shaft $A'$. On the other end of the shaft $A'$ is keyed or otherwise secured a bracket $A^4$, which is provided with perforations $a^8$, as illustrated in Fig. 16.

Loosely mounted on the shaft $A'$ is a sleeve $a^9$, carrying a crank-arm $a^{10}$. This crank-arm $a^{10}$ carries a spring $a^{11}$ and a pin $a^{12}$, normally pressed through a perforation in the arm $a^{10}$ by said spring $a^{11}$. The pin $a^{12}$ is adapted to engage one of the perforations $a^8$ of the bracket $A^4$ to lock the crank-arm $a^{10}$ in varying positions to said bracket, substantially as indicated in Figs. 16 and 17. From the crank-arm $a^2$ and crank-arm $a^{10}$ extend the links B, each of which is pivoted to an arm $b$, connected to a cam-slide C on either side of the machine. There may be on either side of the machine a series of these cam-slides C, corresponding in number to the number of articles adapted to be knitted at one operation of the machine, one cam-slide on each side being all that is required to knit each separate article. In the drawings is illustrated a machine adapted to knit two articles at one operation, and hence have been shown two of said slides on each side of the machine. The arm $b$ is connected to one of these slides, and the two slides C are connected by a plate $c$, so that the two slides on one side move in unison when the shaft $A'$ operates the corresponding link B and arm $b$ of that side. The cam-slides C are mounted by a dovetailed connection upon the side frames $A^5$, and have a range of lateral motion on the said side frames $A^5$ of the machine and carry at their upper ends a cam-plate $C'$. This cam-plate $C'$ is provided with the three cam-surfaces $c'$, $c^2$ and $c^3$, two of which, $c'$ and $c^2$, lie in the same plane and are at either end of the plate $C'$, while the other, $c^3$, is in a higher plane and between the throw-surfaces of the other cams $c'$ and $c^2$, substantially as illustrated in Figs. 4, 7 and 9.

The plate or bar $c$, connecting the slides C on one side of the machine, carries a rod D, bent, as at $d$ and $d'$, to conform to the slanting shape of the sides of the machine. The end $d^2$ of this bar D lies directly above two plates or bars $e$ and $e'$, each connecting the thread-guides E and E' in pairs when two articles are to be knit on one machine. The thread-guides E and E' are each secured by screws or otherwise to a block $E^4$, each block $E^4$ being in dovetailed sliding engagement with a plate $E^3$, which in turn is firmly supported upon the framework of the machine, to which it may be secured by screws or otherwise, all as illustrated in Figs. 1, 18 and 19. One of these plates or bars $e'$ is provided with two pins $e^2$ and $e^3$, and the other plate or bar, $e$, is provided with one pin $e^4$. The end $d^2$ of the rod D lies in the path of these pins, and when the rod D moves from left to right or right to left alternately it impinges upon the pin $e^3$ or the pin $e^4$, and this rod D, if desired, is flattened at the point of impingement. This rod D is thus adapted to shift through the pin $e^3$ the plate $e'$ and the guide E' and through the pin $e^4$ the plate $e$ and the guide E. During certain intervals in the knitting of the article it is necessary for the end $d^2$ of the rod D to be lifted out of the path of the pins $e^3$ and $e^4$, and for this reason the rod D is hinged, as at $d^4$, and provided with a spring $d^{15}$, which normally tends to press the end $d^2$ downward into the path of the pins. The mechanism for lifting the end $d^2$ against the tension of the spring $d^{15}$ will be hereinafter fully explained. The pins $e^3$ and $e^4$ may, if desired, be square—that is, present to the rod D a flat surface—to insure greater frictional contact between the said pins and rod, as will be readily understood from Figs. 1, 2, 5 and 6 of the drawings.

On the other side of the machine the plate or bar $c$, which connects the slides C, carries a rod D', bent, as at $d^5$ and $d^6$, to conform to the slanting shape of the sides of the machine, and its end $d^7$ lies in the path of the pins $e^2$, $e^3$, and $e^4$, so that when the rod D' travels from left to right or right to left it impinges on either pin $e^3$ or $e^4$, and during heel and toe knitting it is locked to the other pin, $e^2$, by the following mechanism: Referring to Figs. 6 and 15, this rod D' carries at its end $d^7$ a sleeve $d^8$, provided with a slot $d^9$ and secured to the rod D' by a screw or pin $d^{10}$, passing through the slot $d^9$, thus allowing a sliding motion of the sleeve upon the rod D'. The sleeve $d^8$ carries a hook $d^{11}$, adapted, when the sleeve is shifted toward the end of the rod D', to engage a pin $e^2$ on the plate or bar $e'$ and to lock the rod D' to said pin. The sleeve $d^8$ also carries the two upright pins $d^{12}$, between which is located the end $f'$ of a bar $f$, which is bent, as at $f^2$, as clearly illustrated in Figs. 2 and 15. This bar $f$ is secured to a shaft $f^3$, operated by a crank-arm $f^4$, slotted, as at $f^5$, to the vertical rod $f^6$, sliding in the guides $f^{11}$. This rod $f^6$ is slotted, as at $f^7$, to a bell-crank lever $f^8$, which in turn is slotted, as at $f^9$, to a pawl F, pivoted to a bracket $f^{10}$ of the frame $A^6$ and adapted to be operated by a toothed disk or wheel G, arranged on a shaft $g$ at right angles to the driving-shaft A', in a manner to be hereinafter more fully explained. The back-and-forth movement of this pawl F is transformed into a vertical or up-and-down movement of the sliding rod $f^6$, and this movement of the rod $f^6$ in turn through the crank-arm $f^4$ and the shaft $f^3$ operates the bar $f$ to slide the sleeve $d^8$ on the rod D', all as indicated in full and dotted lines in Figs. 6 and 15. By this mechanism the rod D', through the sleeve and hook, may be locked or unlocked to the pin $e^2$.

The pawl F is bent at right angles, as at F', and carries the clutch-fork $a^7$, which is adapted to shift the sleeve $a^5$ into and out of engagement with the sleeve $A^2$, carrying the crank-arm $a^3$, as fully illustrated in Figs. 1 and 6 of the drawings.

The rod D' is also hinged, as at $d^{13}$, and carries above the hinge a sleeve $h$, similar in construction and arrangement to the sleeve $d^8$—that is to say, it is slotted to the rod D' and has a range of up-and-down movement thereon. This sleeve $h$ is provided with the two upright pins $h'$, within which the end $h^2$ of a curved arm $h^4$ is adapted to rest. This curved arm $h^4$ is secured at its other end to the shaft $f^3$, and when the said shaft is oscillated by the mechanism hereinabove mentioned the arm $h^4$ will shift the sleeve up and down on the rod D', as illustrated in full and dotted lines in Figs. 2 and 6 of the drawings. Directly beneath the rod D' and under the sleeve $h$, when in its normal position, as indicated by full lines in Fig. 6, is arranged a plate H, screwed or otherwise secured to the frame of the machine, and on this plate H are arranged cam-latches $h^5$, as illustrated in Figs. 2 and 14. Each cam-latch is pivoted, as at $h^6$, to the side of said plate H, and its free end $h^7$ is straight and normally supported above the face of the plate H by means of a spring $h^8$. Below the point of pivotal support $h^6$ is a lug $h^9$, integral with the latch $h^5$. On the side of the plate H is also secured a spring $h^{10}$, the free end of which extends above the lug $h^9$ of the latch $h^5$.

When the bar D' is shifted from one end of the machine—as, for instance, from left to right—the sleeve $h$, if it is in the position indicated in full lines in Fig. 6, will lie in the path of the latch $h^5$, and will impinge first upon its cam-surface $h^{11}$ and be lifted thereby, the bar D', being also raised, moving on its hinge $d^{13}$ until the sleeve rests on the straight end $h^7$. The rod and sleeve then traverse the latch until the sleeve reaches the extreme end of the latch, which is supported by the stop-pin $h^{12}$, secured to the side of the plate H. When this rod and sleeve clear the latch $h^5$ the spring $h^8$ throws the latch over and the lug $h^9$ raises the spring $h^{10}$. The spring $h^{10}$ then returns the latch $h^5$ into its normal position, which is the position indicated by full lines in Fig. 14. The latch raises the rod D' as described, sufficiently to permit its end $d^7$ to clear the pins $e^2$, $e^3$, and $e^4$, so that said end $d^7$, unless locked to the pin $e^2$ by the mechanism hereinbefore described, will in its travel from left to right rest behind the pin $e^2$, and in its travel from right to left will rest behind the pin $e^4$. The rod D' thus shifts alternately the plate $e$ and its thread-guide E and the plate $e'$ and its thread-guide E'. When the rod D' is shifted from right to left the sleeve $h$ is not raised by the latch, but abuts against the curved face $h^{14}$ of the end $h^7$ of the latch $h^5$ and throws the latch over, as shown in dotted lines in Fig. 14. The guides E and E' are substantially triangular in cross-section and are each provided with a downwardly-projecting edge $E^2$, which, when each guide is moved, impinges against the latches of the needles and opens the same during certain intervals of the knitting operation, or in the instance of hosiery at the beginning of the fabrication thereof, substantially as illustrated in Fig. 18.

When the bar D' through the sleeve $d^8$ and hook $d^{11}$ is locked to the pin $e^2$, as hereinafter described, the slide $f^6$, through the arm $f^4$ and the shaft $f^3$, will operate the arm $h^4$ and throw the sleeve $h$ into the position shown in dotted lines in Fig. 6—that is to say, out of alignment with the cam-latches $h^5$. In such position the end of the bar D' is not raised by the cam-latches. When the bar D' is unlocked from the pin $e^2$ the sleeve $h$ is shifted back into the position shown in full lines in Fig. 6, when the cam-latches $h^5$ will operate against the sleeve $h$, as hereinbefore described, and raise the end of the bar D'.

From the slide $f^6$ extends an arm $i$, the free end of which lies above the arm $i^2$ of a sector-lever $i^3$, which is pivoted upon a stud $i^4$ at the end of the plate H', resting immediately under the arm D and secured to the main frame of the machine. This sector-lever $i^3$ meshes with a sector-gear $i^5$, secured to a shaft $i^6$, which in turn carries a plate $i^7$, resting against the under surface of the hinged end $d^2$ of the bar D. When now the slide $f^6$ is depressed the arm $i$ will impinge upon the sector-lever and through the sector-gear and shaft the plate $i^7$ will be elevated into the position shown in dotted lines in Fig. 6, and the end $d^2$ of the bar D will be elevated against the tension of the spring $d^{15}$ out of the path of the pins $e^3$ and $e^4$. As before explained, the depression of this slide $f^6$ serves to lock the opposite bar D' to the pin $e^2$, and hence it follows that when the bar D' is locked to the pin $e^2$ the bar D is lifted out of the path of the pins $e^3$ and $e^4$ and also out of the path of the end $d^7$ of the bar D'.

The plate $i^7$ extends longitudinally along the side of the machine throughout the length of travel of the bar D, so that no matter what the position of the bar D with respect to its travel the plate $i^7$ rests below the end $d^2$ and is adapted to raise the same when the slide $f^6$ is depressed. When the slide $f^6$ is raised the plate $i^7$ is returned to its normal position, (indicated by the full lines in Fig. 6,) and the end $d^2$ of the bar D is returned into the path of the pins $e^3$ and $e^4$ by the flat spring $d^5$.

On either side of the machine below the plates H and H' are arranged the needle-beds J. These beds are channeled or grooved, as at $j$, presenting a rack-like appearance, and in these grooves or channels are placed the needle-slides K. Each individual needle-slide K has a longitudinal movement in the channel $j$, and also a vertical movement therein. The needle-beds J also carry at their ends the comb or rack $j^2$, between the teeth of which the needles $l$, carried by the needle-slides K, are adapted to move.

Each needle-slide K is normally held down in the groove or channel $j$ of the needle-bed by a spring $k'$, secured to the plate H or H', the free end of the spring being bent into substantially a V shape, as at $k^2$, and adapted, when the needle is not thrown into action, to rest in a corresponding notch $k^3$ in the top surface of the needle-slide K, substantially as illustrated in Figs. 6, 7 and 10, and to thereby lock the needle-slide and prevent its movement longitudinally in the groove or channel $j$.

Referring to Fig. 7, the forward end of each needle-slide K is beveled, as at $k^4$, and recessed, as at $k^5$. In the recess $k^5$ is located the bent end $l^2$ of the latch-needles $l$, which needles are carried and directly operated by the needle-slides K. At the rear end of each needle-slide is provided a slot or recess $k^6$, in which the upper end of a jack-lever M is adapted to fit. These levers M or "jacks" consist of thin flat bars or plates $m$, pinned or pivoted, as at $m'$, in a rack-like bracket or extension $m^2$ of the downward extension $j^3$ of the needle-bed J. These jacks are arranged in line with the cam-plate C', the point of pivotal support $m'$ of the jacks lying between the upper cam-surface, $c^3$, and the lower cam-surfaces, $c'$ and $c^2$, and arranged so that the cam-surface $c'$ or $c^2$ will throw the lower free end of each jack inward and the upper end of each jack outward, while the upper cam-surface, $c^3$, throws the upper end of each jack inward and the lower end outward.

The movement of the jacks $m$ by the cam $c^3$ serves to throw forward the needles $l$ through the needle-slides K, substantially as shown in Fig. 7, while the movement of the cams $c'$ and $c^2$ serves to retract the needles and needle-slides, substantially as shown in Fig. 6.

The extreme free ends of the needle-slides rest or are supported by fashioning-slides $p$ and $p'$ on either side of the machine in the following manner:

Referring to Figs. 1, 4, 6, 7, 8, and 10, a frame $n^3$ carries on either side the two fashioning-slides $p$ and $p'$, which are movable longitudinally with respect to each other in a frame $n^2$. At one end of the machine one of the slides—as, for instance, $p$—is provided with a pin $p^2$, adapted to fit in a slot $p^3$ of a bracket-arm $p^4$ and to secure the slide to said bracket. At the other end of the machine the other fashioning-slide $p'$ is similarly connected to a similar bracket or arm $p^5$. One or both of these slides $p$ and $p'$ may be recessed, as at $p^6$, as illustrated in Fig. 10, to a width corresponding to that of the entire number of needle-slides K combined. A machine has been illustrated wherein two articles are to be knit simultaneously, and hence both slides $p$ and $p'$ are illustrated as recessed in Fig. 4, but it is to be understood, as will be apparent from the description of the operation hereinafter given, that if the machine were adapted to knit but one article only one of these fashioning-slides need be recessed. When all the needles and needle-slides are in operative position the ends of the needle-slides rest in the recessed portion $p^6$ of the slides, and when the needles and needle-slides are out of operative position the ends of the needle-slides rest on the upper edge $p^7$ of the slides. By shifting the slides $p$ and $p'$ longitudinally with respect to each other the number of needles resting in the recessed portion thereof may be increased for widening the fabric or decreased for narrowing the fabric. The shifting longitudinally of these slides $p$ and $p'$ is accomplished as follows:

Referring to Figs. 1, 4, 6, 7, and 8, it will be seen that the bracket-arms $p^4$ and the bracket-arms $p^5$ are secured to sleeves $p^8$, adapted to slide longitudinally on short fixed shafts $p^9$, secured to the end frames $A^6$. Each sleeve $p^8$ carries on its under surface two toothed racks $p^{10}$ and $p^{11}$, the teeth $p^{12}$ and $p^{13}$ of which are oppositely arranged with respect to each other. Below one of the racks $p^{10}$ is placed a pawl $r$, which projects from a sleeve mounted upon the shaft $r^2$, having a bearing in an arm $s$, carried by the shaft $s'$, having a bearing in the bracket $r^3$, secured to one of the end frames $A^6$. The other end of the shaft $s'$ is secured to an angle-arm $r^4$, the lower end of which is provided with a roller $r^5$, normally resting upon the plain periphery of the wheel O, back of the flange $o'$ thereof. In the plain periphery of this wheel O is cut a step-like recess $o^2$, into which the roller $r^5$ is adapted to fall during the revolution of the wheel O. This movement of the roller $r^5$ is transmitted through the arm $r^4$ to the shaft $s'$, which serves through the arm $s$ and shaft $r^2$ to thrust the pawl $r$ against the teeth of the rack $p^{10}$. One revolution of the wheel O will thus throw the pawl into and out of engagement with the rack $p^{10}$ to advance the sleeve $p^8$ one tooth of said rack. This movement is transferred to the other end of the machine to a similar arm $r^6$, operating a similar rack $p^{10}$ of the sleeve $p^8$, by means of a rod $r^7$, as illustrated in Fig. 1.

This movement of the sleeves $p^8$ serves to draw out the slides $p$ and $p'$, so that the recessed portion is gradually widened, thus permitting the needle-slides to drop down one by one into said recess to thus widen the fabric by bringing more and more needles into operation.

To narrow the fabric it is necessary first to lower the frame $n^2$ and slides $p$ and $p'$ carried therein below the normal position of the ends of the needle-slides—that is, when the same rest upon the jacks—and in this lowered position to shift the slides inward, so as to decrease the width of the recess into which the ends of the needle-bars will fall when the frame and slides are raised to their normal position.

As the mechanism illustrated in Figs. 1 to 17, inclusive, is particularly adapted for the knitting of hosiery, and since in the knitting of hosiery it is necessary to narrow and widen at one side of the machine, as in the construction of the heel portion, while the other side of the machine is idle, there is provided the following mechanism by means of which the slides $p$ and $p'$ on one side of the machine may be shifted to decrease the width of the recess $p^6$ without interfering with the ends of the needle-slides:

On one side of the machine (represented in Fig. 6 as being the left-hand side) is placed a shaft N, extending from one end to the other of the machine, having its bearing in the end frames $A^6$. One or both ends $n$ of this shaft N is rectangular in shape, and to this rectangular end is secured a handle $n'$. The rear ends of the needle-slides K are supported in the movable frame $n^2$, which is mounted, as shown in Fig. 10, by screwing or otherwise securing the ends of the frame $n^2$ upon the ends of the arms or levers $n^3$, pivoted, as at $n^4$, in the end frames $A^6$. When the handle $n'$ is turned by hand into the position indicated in dotted lines in Fig. 6, the rectangular end $n$ of the shaft N, which is arranged as to its longer axis at right angles to the handle $n'$, presents its smaller width to the arms $n^3$, thus permitting the frame $n^2$ and the fashioning-slides $p$ and $p'$ to be depressed below the inner ends of the needle-slides K, which are supported on the jacks $m$; and thus permits the shifting of the slides $p$ and $p'$ without impinging against the needle-slides. It is also necessary when narrowing on the other side of the machine (represented to be the right-hand side in Fig. 6) that the frame $n^2$ be lowered, the slides shifted inward to decrease the width of the recess in which the ends of the operative slides and needles are to rest, and the frame $n^2$ then raised to throw all the slides, except those carrying the necessary operative needles, out of engagement with the jacks. This is accomplished in the following manner:

Referring now to Figs. 6, 8 and 11, beneath the pivoted arms $n^3$, which support the frame $n^2$, on which the ends of the needle-slides rest, is placed a shaft N', having similar bearings in the frames $A^6$ as the shaft N. One or both ends $n^7$ of this shaft $N'$ is trapezoidal in shape, and to one end is secured a crank-arm $n^8$, which carries a pin $n^9$, working in a slot $n^{10}$ of the vertically-moving shaft $n^{11}$. The lower end of this shaft $n^{11}$ is slotted, as at $n^{12}$, and into this slot extends one end of a bell-crank $n^{13}$, the other end of said lever $n^{13}$ being provided with a roller $n^{14}$, resting upon the periphery of the wheel O, secured to the driving-shaft $A'$ and rotating therewith. On the periphery of the wheel O is placed a flange $o'$, substantially as illustrated in Fig. 8, and this flange $o'$, when the wheel O rotates, is adapted to raise and the plain periphery to lower the roller $n^{14}$, to thereby raise and lower the shaft $n^{11}$, and through the crank-arm $n^8$ and shaft $n^7$ to lower or raise the arms $n^3$, carrying the frame $n^2$ and slides $p$ and $p'$, upon which the ends of the needle-slides K rest.

At the same instant that the frame $n^3$ and the slides $p$ and $p'$ are lowered it is necessary to shift the latter inwardly to lessen the width of the recess in which the ends of the needle-slides carrying the operative needles are adapted to rest. This is accomplished in the following manner: Below the other rack $p^{11}$ and adapted to shift the same in the direction indicated by the arrow in full lines in Fig. 8 is provided a pawl $r'$, which is carried by the sleeve mounted on the shaft $r^2$. On the other side of the sleeve, upon shaft $r^2$—that is, diametrically opposite—is a projecting finger $s^2$, by means of which the sleeve of the shaft $r^2$ may be oscillated upon the shaft $r^2$ to present either pawl $r$ or $r'$ to the teeth $p^{12}$ or $p^{13}$ of the rack $p^{10}$ or $p^{11}$. As illustrated in Fig. 8, the pawl $r'$ is presented to the teeth $p^{13}$ of the rack $p^{11}$, and will therefore shift the sleeve $p^8$ inward one tooth on either side of the machine by means of the roller $r^5$, as hereinbefore fully explained. The mechanism for operating the finger $s^2$ to oscillate the sleeve is illustrated in Figs. 1, 6 and 13. On the face of the wheel G projects a rim or flange $t$, which extends approximately over one-half the face of said wheel. In the path of this flange $t$ rests a roller $t'$, secured to the end of the arm $t^2$, which is pivoted at its other end, as at $t^3$, to one end of a pivoted lever $t^4$. To the same end of the lever $t^4$ is secured a bracket-arm $t^5$, provided with pins $t^6$, between which rests the finger $s^2$, which oscillates the sleeve. To the other end of the lever $t^4$ is secured one end of a rod or shaft $t^7$, extending across the machine from end to end and carrying at its free end a bracket-arm $t^8$, having a forked extension $t^9$, surrounding the finger $s^2$ of the sleeve on the opposite side of the machine. A spring $t^{10}$, secured at one end to the end frame $A^6$ and at the other end to the rod $t^7$, serves to press the roller $t'$ against the face of the wheel G. If now the wheel G rotates, the roller $t'$ will travel alternately over the plain face of the wheel and the flange thereof, thus shifting the lever $t^4$ in and out, and thereby, through the connections above described, oscillating the sleeve, through the finger $s^2$, to present either the pawl $r$ to its toothed rack $p^{10}$ or the pawl $r'$ to the toothed rack $p^{11}$. As this flange extends upon half the surface of the wheel G, the roller $t'$ will for half the revolution of the wheel G travel on the flange and the other half of the revolution of the wheel G on the plain face of said wheel.

As hereinbefore remarked, the mechanism illustrated in Figs. 1 to 17, inclusive, is particularly adapted for the knitting of hosiery, and it may be further remarked that the rotation of the wheel G takes place only when the heel of the stocking is to be knit, for in such heel it is necessary to gradually narrow for a certain number of courses and then to widen in the same manner for the same number of courses. The teeth $g'$ on one half of the circumference of the wheel G and opposite the flange $t$ represent, therefore, the number of courses knit during which the narrowing takes place, while the teeth on the opposite half of the circumference represent an equal number of courses during which widening takes place.

The movement of the wheel G is controlled by the following mechanism: Resting on the circumference of the wheel and traveling idle on a blank space $g^2$ of two teeth thereof is a pawl $u$, as illustrated in Fig. 7. This pawl $u$ is provided with a slot $u'$ at its lower end in which is located a pin $u^2$ carried on one end of a lever $u^3$ pivoted upon the end frame $A^6$. The free end $u^4$ of the lever $u^3$ is normally pressed upward against a stop-pin $u^5$ on the frame $A^6$ by means of a spring $u^6$. The free end of the lever $u^3$ is located in the path of a dog or lug $u^7$ carried by one of the cam-slides C on the right-hand side of the machine, substantially as shown in Fig. 9, so that the movement of this plate back and forth will depress the free end $u^4$ of the lever $u^3$ against the tension of the spring $u^6$ and thereby throw the pawl $u$ upward for a distance of one tooth of the wheel G. During the operation of straight knitting the wheel G is in the position indicated in Fig. 7, and the pawl $u$ rides idle on the blank portion $g^2$ of the wheel G. When, however, the heel portion is to be knit a pattern-chain V, which may be connected with the machine in any well-known manner and operated by any well-known means, presents a projection $v$ under the slotted end $u'$ of the pawl $u$, elevating the pawl $u$ a distance of three teeth, and thus advancing the pawl over the blank portion $g^2$ and into engagement with a tooth of the wheel G and rotating the same one tooth. The projection $v$ is then carried by the pattern-chain V past the slotted end $u'$ of the pawl $u$, and which pawl immediately drops backward a distance of three teeth, resting in a tooth below the blank portion $g^2$ of the wheel G. The movement of the cam-slide C will thereafter, through the dog $u^7$ and the lever $u^3$, advance the pawl $u$ one tooth at a time, thus rotating the wheel G one tooth. At the beginning of the rotation of the wheel G the pawl F, which normally rested in a step-like recess $g^3$ of a plate on the side of the wheel G, is thrown out of said recess, and the movement of the pawl F, as hereinbefore explained, serves to lock the sleeve $d^8$ of the thread-guide bar or rod D' to the pin $e^2$ of the thread-guide plate $e'$, and also serves through the clutch-fork $a^7$ to shift the sleeve $a^5$ out of engagement with the sleeve $A^2$, carrying the crank-arm $a^2$, operating the cam-slides on that side of the machine, thus throwing that side out of operation.

During the operation of straight knitting the wheel G, being at rest, the pawl F is confined in the step-like recess $g^3$ of said wheel. The pawl F is connected by the pin $f^9$ to one end of a slide $w$, slotted as at $w'$, and secured to the frame $A^6$ by pins or screws $w^2$ passing through the slots $w'$. The slide $w$ thus has a longitudinal movement controlled by the pawl F, and its pin $f^9$ and the end $w^3$ of the slide is adapted, when the pawl F is confined in the step-like recess $g^3$ of the wheel G, to slide over the arm $n^{13}$, which carries the roller $n^{14}$ and operates the mechanism for lowering the fashioning-slides $p$ and $p'$ and the frame $n^2$, and to depress said arm $n^{13}$ against the tension of the spring $n^{15}$, substantially as illustrated in Figs. 6, 8, and 11. In this position the arm $n^{13}$ and the roller $n^{14}$ will occupy the position shown in dotted lines in Fig. 8, the roller $n^{14}$ being elevated above the flange $o'$ of the wheel O, and the shaft $n^{11}$ is depressed, occupying the position indicated by the full lines in Fig. 6, by which the arms $n^3$ of the frame $n^2$, carrying the fashioning-slides $p$ and $p'$, are elevated into their normal position, in which position the ends of the needle-slides not in operation rest upon the unrecessed portions of said slides $p$ and $p'$. The frame $n^2$ and the slides $p$ and $p'$ are thus locked in such position on that side of the machine, while the wheel G is idle—that is to say, when the straight portion and not the heel portion of the stocking is being knit. Again, when the straight portion of the fabric is being knit it may be unnecessary to widen or narrow and hence unnecessary to shift the slides $p$ and $p'$.

To lock the mechanism for shifting the fashioning-slides lengthwise out of operative position there is placed on the frame $A^6$, as indicated in Figs. 6, 8, and 11, a sliding bracket $y$, slotted as at $y'$, and united to the frame $A^6$ by screws or pins $y^2$ passing through said slots $y'$. This bracket $y$ carries at one end an arm $y^3$, a pin $y^4$ arranged at one end thereof resting over the pattern-chain V and in the path of certain oppositely-arranged projections $v^2$ and $v^3$ of the same, while the other end $y^5$ extends to one side and below the arm $r^4$, carrying the roller $r^5$. When now the pattern-chain V is operated one projection $v^2$, as illustrated in Fig. 12, is adapted to impinge against the pin $y^4$ of the arm $y^3$ and to slide the bracket $y$ to the left—that is to say, so that the end $y^5$ may slide under the arm $a^4$ and hold the same and its roller $r^5$ against the tension of the spring $r^8$, which normally tends to press the arm $r^4$ and its roller $r^5$ against the periphery of the wheel O. The roller $r^5$ is thereby prevented from entering the step-like recess $o^2$ of the wheel O, and the shifting of the slides, as hereinbefore described, is thereby prevented. The oppositely-arranged projection $v^2$ of the pattern-chain V will, whenever necessary, throw the bracket $y$ and the end $y^5$ of its arms $y^3$ out of engagement with the arm $r^4$ of the roller $a^5$ to permit of the widening or the narrowing of the article being fabricated.

A description of the operation of the machine during the knitting of a stocking will now be given beginning with the toe portion first and the positions of the needles, cams, and thread-guides at the beginning of the toe portion, for example, as illustrated in Figs. 3 and 18. With reference to Fig. 3 it will be observed that the cam-plates on either side of the machine are directly opposite each other, which is not usually the case in the operation of this machine, one cam-plate on one side being in advance of the other cam-plate on the other side, as shown in Figs. 1, 2 and 4. To bring these cam-plates opposite each other, as indicated in Fig. 3, the crank-arm $a^{10}$ is adjusted by means of the bracket $A^4$, so that said arm $a^{10}$ is in alignment with the crank-arm $a^2$ on the other side of the machine, and one of the rods D D', by preference D', is lifted, so that it rests above or on top of the rod D. This adjustment of the cam-plates and rods D' and D may be performed manually. The cam-plates are then shifted from left to right, throwing the needles outward into operation, substantially as illustrated in Fig. 18, the needles from opposite sides of the machine crossing each other substantially as shown in Figs. 3 and 18. In this position the edge $E^2$ of one of the thread-guides throws open the latches of the needles as it travels over the same. A single thread T from one of the thread-guides E is caught by these needles on opposite sides of the machine forming a single course of loops S, as illustrated in Figs. 18 and 23. When a sufficient number of loops S has been formed, depending of course on the width of the toe of the stocking, the cam-slides and the rods D' and D are restored to their normal positions and the knitting with two threads T and T' is begun. It will be observed from the drawings that one thread-guide—E, for instance—is in front of the other thread-guide when the thread-guide plates $e$ and $e'$ are shifted in one direction and that the thread-guide E' precedes or is in front of the other thread-guide E when the plates are shifted in the opposite direction. It follows, therefore, that a thread T from guide E is fed first to such needles as are first thrown into action by the cam-slides on one side of the machine during the shifting of the plates $e$ and $e'$ in one direction, and that the thread T' is fed immediately afterward to the needles on the opposite side of the machine, which needles are brought into action by their cam-slides immediately after the corresponding needles on the opposite side of the machine have taken up the thread T.

The cam-slides for operating the needles on either side of the machine maintain a fixed relationship to each other—that is to say, a cam-slide on one side of the machine will always operate the needles on that side before the corresponding needles on the opposite side have been brought into action by the other cam-slide, and this will be so no matter in what direction the cam-slides are traveling. Hence on the return stroke of the cam slides and plates $e$ and $e'$ the threads T and T' will be fed in a manner directly contrary to that set forth above—that is to say, the thread T' on the return stroke of the cam slides and plates $e$ and $e'$ will be first fed to the needles and will be caught up by the needles opposite to those which previously caught up said thread, and the thread T will be fed afterward to the needles on that side of the machine which have previously taken up the thread T'. This operation will be more clearly understood from Fig. 19, and the position of the meshes will be clearly understood by referring to Figs. 23 and 24.

At either end of the machine, when the threads T and T' are fed to opposite sides of the machine, a crossing X of the thread results with this peculiarity, that one thread—T, for instance, at one end of the machine—is always the upper crossing-thread, and the other thread, T', at the other end of the machine is always the upper crossing-thread. This is so because, as above explained, the thread T at one end of the machine is always taken up last by the needles on the return movement of the plates $e$ and $e'$, while at the other end of the machine the thread T' is the last always to be taken up by the said needles.

After the toe portion has been knit with gradually-increasing meshes, for which purpose the pattern-chain through its projection $v^3$ has permitted the roller $r^5$ to rest on the periphery of the wheel O, to thereby separate the fashioning-slides, as before described, and the foot portion has been knit straight, during which time the projection $v^2$ of the pattern-chain V has shifted the bracket-arm $y^5$ under the arm $r^4$ of the roller $r^5$, and locked it from movement, as before explained, the heel portion is begun. At this instant, as before explained, the wheel G, which makes one revolution during the knitting of a heel, begins to rotate and its movement throws the pawl F out of the step-like recess $g^3$ and through the clutch-fork $a^7$ stops the operation of the cam-slides C on one side of the machine. The fabric is gradually narrowed and then correspondingly widened until the heel is formed, when both sides of the machine are again brought into operation and straight or widened knitting is continued until the stocking is finished. While the heel is being formed the handle $n'$ of the shaft N is turned by hand so that the frame $n^2$ is lowered to permit of the fashioning-slides $p$ and $p'$ on that side of the machine being shifted inward during narrowing while the needle-slides are out of the recess of said fashioning-slides.

The method hereinbefore described I do not lay claim to in the present application, as the same forms the subject-matter of an application for a patent, Serial No. 535,344, filed January 18, 1895.

It will be manifestly obvious that as to minor details further modifications may be made in the arrangement of the machine of my invention without departing from the scope or spirit thereof.

Having thus described the nature and objects of my invention, what I claim as new, and desire to secure by Letters Patent, is—

1. In a straight-knitting machine, a driving-shaft, a bracket secured thereon and provided with openings, a sleeve loosely mounted on said shaft, a crank-arm carried by said sleeve, a spring-controlled pin carried by the crank-arm and adapted to enter one of the openings in the bracket to secure the sleeve to the bracket, a link pivoted to the crank-arm, a cam-slide and an arm securing the cam-slide to the link, substantially as and for the purposes set forth.

2. In a straight-knitting machine, a driving-shaft, a sleeve loosely mounted on one end thereof, a crank-arm carried by said sleeve, mechanism for locking and unlocking the sleeve to and from the driving-shaft, a bracket secured to the other end of the driving-shaft and provided with openings, a second sleeve mounted on the bracket end of the shaft, a crank-arm carried by the second sleeve, a spring-controlled pin carried by the crank-arm and adapted to enter said openings of the bracket to secure the sleeve to the bracket, links pivoted to said crank-arms, a cam-slide on either side of the machine and an arm securing a cam-slide to its respective link, substantially as and for the purposes set forth.

3. In a straight-knitting machine, a thread-guide plate, two thread-guides connected thereby, a pin on the thread-guide plate, a bar adapted to normally impinge against said pin to shift said thread-guide plate in one direction, means for shifting said bar and means for locking said bar to said pin during a certain interval in the knitting to thereby shift said thread-guide plate in either direction, substantially as and for the purposes set forth.

4. In a straight-knitting machine, a thread-guide plate, two thread-guides connected thereby, a pin connected with said thread-guide plate, a bar adapted to normally impinge against said pin to shift said plate in one direction, means for shifting said bar, a sleeve adapted to slide on said bar, a hook carried by said sleeve and means for shifting said sleeve on the bar to bring the hook into and out of engagement with said pin during a certain interval in the knitting, substantially as and for the purposes set forth.

5. In a straight-knitting machine, a thread-guide plate, two thread-guides connected thereby, a pin on said plate, a bar adapted normally to impinge against said pin to shift said plate in one direction, means for shifting said bar, a sleeve adapted to slide on said bar, a hook carried by said sleeve, two pins secured to the sleeve, a bar having one end located between said sleeve-pins, a shaft carrying said bar, a crank-arm adapted to oscillate the shaft so as to shift said bar and thereby through said sleeve-pins and said sleeve to throw the hook into and out of engagement with the pin of said plate during certain intervals in the knitting, and means for operating the crank-arm of said oscillating shaft, substantially as and for the purposes set forth.

6. In a straight-knitting machine, two thread-guide plates, two thread-guides connected by each of said plates, a bar, means for shifting the same back and forth, a pin carried by each thread-guide plate and located in the path of said bar, and means for throwing said bar back of each pin alternately at the end of the line of travel of the bar in each direction, substantially as and for the purposes set forth.

7. In a straight-knitting machine, two thread-guide plates, two thread-guides connected by each of said plates, a bar, means for shifting the same back and forth, a pin carried by each thread-guide plate and located in the path of said bar, and a cam-latch located at the end of the line of travel in each direction of the shifting-bar and adapted to throw the bar at those points back of each pin alternately, substantially as and for the purposes set forth.

8. In a straight-knitting machine, two thread-guide plates, two thread-guides connected by each of said plates, a bar, means for shifting said bar back and forth, a pin carried by each thread-guide plate, a sleeve sliding on the shifting-bar, a cam-latch located below and in the path of the sleeve so that when the said sleeve is in its normal position it is adapted to raise the bar and sleeve to throw the bar at the end of the line of travel of the same back of each pin alternately and means for shifting the sleeve into and out of alignment with the cam-latch, substantially as and for the purposes set forth.

9. In a straight-knitting machine, thread-guide plates, two thread-guides connected by each of said plates, pins on the thread-guide plates, two bars adapted to normally impinge against said pins to thereby shift the guide-plates, means for shifting said bars, a sleeve sliding on one of said bars, a hook carried by the sleeve, two upright pins secured to the sleeve, a bar having one end located between the pins, a shaft carrying said bar, a crank-arm adapted to oscillate said shaft to thereby through said bar and upright pins, shift the sleeve and lock its hook in engagement with one of the pins of the thread-guide plates, a slide adapted to operate said crank-arm, means controlled by said slide and adapted to raise the other thread-guide bar out of alignment with the pins on the thread-guide plates when the sleeve and hook of the first thread-guide bar are locked, and means for raising and lowering said slide, substantially as and for the purposes set forth.

10. In a straight-knitting machine, thread-guide plates provided with pins, thread-guides connected thereby, thread-guide bars adapted to shift the same through said pins on said plates, a sleeve sliding on one of said bars and provided with a device adapted to lock the same to a pin of one thread-guide plate, a slide and means controlled thereby to operate said sleeve, an arm secured to said slide, a sector-lever controlled by said arm, a sector-gear meshing with said sector-lever, a shaft adapted to be oscillated by said sector-gear, a plate carried by said shaft and resting against the under surface of the spring-controlled hinged end of the other of said thread-guide bars and adapted to raise and lower the same to throw the said thread-guide bar out of and into alignment with the end of the other thread-guide bar, and means for operating said slide, substantially as and for the purposes set forth.

11. In a straight-knitting machine, a series of needle-slides, needles connected with said slides, jacks, one end of each of which is adapted to rest in a slot in a slide to advance and retract the same so as to throw the needles and thereby cause the same to knit, means to operate said jacks, and mechanism to lift said slides out of engagement with said jacks, substantially as and for the purposes set forth.

12. In a straight-knitting machine, two fashioning-slides each provided with a recess, means for moving said fashioning-slides lengthwise, a series of needle-slides, needles carried thereby, the free ends of said needle-slides when in operative position resting in the recessed portion of said fashioning-slides, jacks in engagement with said needle-slides when the same are in operative position, means for dropping fashioning-slides so as to liberate the same from the free ends of said needle-slides and permit said fashioning-slides to be moved inward and then raising said fashioning-slides so as to support the needle-slides on the unrecessed portion of the bars out of engagement with said jacks, and means for operating said jacks to advance and retract said needle-slides when in engagement with said jacks to throw the needles and thereby cause the same to knit, substantially as and for the purposes set forth.

13. In a straight-knitting machine, fashioning-slides, means for moving said fashioning-slides lengthwise, needle-slides, needles, jacks connected with said needle-slides, means for dropping said fashioning-slides, to permit the same to be moved inward and then raising them to support on their unrecessed portion the needle-slides above said jacks and means for advancing and retracting said jacks to throw the needles and thereby cause the same to knit, substantially as and for the purposes set forth.

14. In a straight-knitting machine, two fashioning-slides each provided with a recess, a series of needle-slides, needles carried thereby, the free ends of the needle-slides, when in operative position resting in the recessed portion of said fashioning-slides, jacks in engagement with said needle-slides when the same are in operative position, means for lowering said fashioning-slides to bring the free ends of said needle-slides out of the recessed portion of said fashioning-slides, means for moving said fashioning-slides lengthwise in opposite directions with respect to each other to decrease the effective width of the recess in said fashioning-slides while the needle-slides are out of said recess, means for elevating said fashioning-slides to raise certain of said needle-slides upon the unrecessed portion of said fashioning-slides out of engagement with said jacks and means for operating said jacks to advance and retract said slides in engagement with said jacks to throw certain needles and thereby cause the same to knit, substantially as and for the purposes set forth.

15. In a straight-knitting machine, two fashioning-slides arranged side by side and overlapping at the ends and each formed with a recess and means for depressing said slides, moving the same lengthwise in opposite directions to decrease the effective width of said recessed portion and elevating said slides into normal position, substantially as and for the purposes set forth.

16. In a straight-knitting machine, two fashioning-slides arranged side by side and overlapping at the ends and each formed with a recess, means for moving said slides in opposite directions to increase or decrease the effective portions of the recesses, comprising a bracket-arm secured to one end of each of said slides, a sleeve carrying said bracket-arm, a shaft on which said sleeve is adapted to slide and means for shifting said sleeve on said shaft to actuate said bracket-arm and slide, substantially as and for the purposes set forth.

17. In a straight-knitting machine, fashioning-slides provided with recesses, a bracket-arm connected with one end of each slide, a sleeve carrying each bracket-arm, a shaft on which said sleeve is adapted to move, a double rack, two oppositely-arranged pawls adapted to engage the teeth of the respective racks, means for shifting said pawls, and means for operating one of said pawls when in engagement with its rack, substantially as and for the purposes set forth.

18. In a straight-knitting machine, two fashioning-slides arranged side by side and overlapping at the ends and each formed with a recess, means for moving said slides in opposite directions to decrease the effective width of the recessed portion, means for depressing said slides and for elevating the same thereafter into normal position, and means for locking said slides in an elevated position at the end of narrowing, substantially as and for the purposes set forth.

19. In a straight-knitting machine, two fashioning-slides arranged side by side and overlapping at the ends and each formed with a recess, means for moving said slides in opposite directions to decrease the effective width of said recessed portion, means for depressing and raising said slides consisting of a shaft, a wheel secured thereto, a flange projecting from a portion of the periphery of said wheel, a roller located in the path of said flange, a lever carrying the roller at one end, means for supporting the fashioning-slides, a shaft and mechanism connecting the shaft with the support of the fashioning-slides for effecting the movement of said slides and in slotted engagement with the other end of said lever, and means for locking said slides in their raised position after narrowing consisting of a slide adapted to depress one end of the lever to lift the roller out of engagement with the flange of said wheel, a pawl connected to said slide and adapted to shift the same into and out of engagement with the lever, and a toothed disk adapted to effect the movement of said pawl, substantially as and for the purposes set forth.

20. In a straight-knitting machine, two fashioning-slides arranged side by side and overlapping at the ends and each formed with a recess, mechanism for lowering said fashioning-slides, mechanism for moving said slides when lowered in opposite directions to increase or decrease the effective width of the recessed portions and means for locking said mechanism in the elevated or inoperative position, substantially as and for the purposes set forth.

21. In a straight-knitting machine, two fashioning-slides arranged side by side and overlapping at the ends and each formed with a recess, mechanism for moving said fashioning-slides in opposite directions to increase or decrease the effective width of the recessed portions, a recessed wheel and a lever with a roller traveling on the periphery thereof and forming part of the mechanism for moving said fashioning-slides, a sliding bracket provided with an arm adapted to lift the roller out of operative position with respect to its wheel to lock the mechanism for moving the fashioning-slides in an inoperative position, and means consisting of a pattern-chain for moving said sliding bracket into and out of engagement with said roller, substantially as and for the purposes set forth.

22. In a straight-knitting machine, fashioning-slides each provided with a recess, a bracket-arm secured to the end of each slide, a sleeve carrying each bracket-arm, a shaft on which each sleeve is adapted to slide, a double rack with oppositely-arranged teeth secured to each sleeve, two oppositely-arranged pawls adapted to engage their respective racks, means for shifting said pawls into engagement with their racks, a sleeve carrying said pawls, an arm and shaft on which said sleeve has its bearing, a shaft carrying said arm, a bracket supporting the arm-supporting shaft, an angle-arm secured at one end to said shaft, a roller secured to the other end of said angle-arm, a wheel on the periphery of which the roller is adapted to bear and provided with a step-like recess located in the path of said roller and adapted to receive the same during the rotation of said wheel operating said pawls through said angle-arm and connections to shift the sleeve, bracket-arm and slides, and means for rotating said wheel, substantially as and for the purposes set forth.

23. In a straight-knitting machine, a driving-shaft, a wheel secured thereto, a flange projecting from a portion of the periphery of said wheel, a lever carrying a roller at one end in the path of said flange, a vertically-moving shaft provided at one end with a slot in which the other end of the lever is engaged, a crank-arm and its pin engaging a slot in the other end of said vertical shaft, a shaft having angular ends and carrying the crank-arm and adapted to be rocked thereby, pivoted arms adapted to be raised and lowered by said angular ends of the rocking-shaft, a frame carried by said arms, and fashioning-slides carried by said frame and longitudinally movable therein, substantially as and for the purposes set forth.

24. In a straight-knitting machine, fashioning-slides, two shafts supported in the end frames of the machine, devices between the shafts and the fashioning-slides, means for manually actuating one shaft and for automatically actuating the other so as to raise and lower said fashioning-slides through said devices, substantially as and for the purposes set forth.

25. In a straight-knitting machine, fashioning-slides, two longitudinal shafts supported in the end frames of the machine, means for manually actuating one shaft and automatically actuating the other, said shafts having angular ends engaging pivotal arms carrying frames which support said fashioning-slides, substantially as and for the purposes set forth.

26. In a straight-knitting machine, fashioning-slides, shafts having angular ends, means for manually actuating one shaft and automatically actuating the other, arms provided with frames and operated by the ends of said shafts and said frames adapted to raise and lower said fashioning-slides, substantially as and for the purposes set forth.

In testimony whereof I have hereunto set my signature in the presence of two subscribing witnesses.

GUSTAV R. HERFURTH.

Witnesses:
 THOMAS M. SMITH,
 GEO. W. REED.